United States Patent

Iehisa et al.

[11] Patent Number: 6,097,747
[45] Date of Patent: Aug. 1, 2000

[54] GAS DISCHARGE EXCITATION LASER DEVICE

[75] Inventors: Nobuaki Iehisa, Mishima; Hitoshi Enokizono, Oshino-mura, both of Japan

[73] Assignee: Fanuc Ltd., Minamitsuru-gun, Japan

[21] Appl. No.: 09/101,020

[22] PCT Filed: Oct. 29, 1997

[86] PCT No.: PCT/JP97/03935

§ 371 Date: Sep. 14, 1998

§ 102(e) Date: Sep. 14, 1998

[87] PCT Pub. No.: WO98/19374

PCT Pub. Date: May 7, 1998

[30] Foreign Application Priority Data

Oct. 29, 1997 [JP] Japan .................................. 8-302375

[51] Int. Cl.$^7$ ....................................................... H01S 3/00
[52] U.S. Cl. ........................................................... 372/38
[58] Field of Search ........................................ 372/38, 86

[56] References Cited

U.S. PATENT DOCUMENTS 5,530,937  6/1996  Sugiyama .................... 372/38

*Primary Examiner*—Teresa M. Arroyo
*Assistant Examiner*—Robert E. Wise
*Attorney, Agent, or Firm*—Staas & Halsey

[57] ABSTRACT

A gas discharge excitation laser device having an improved response of an actual output to transition from a laser output ON command to a laser output OFF command. When a command output is switched from ON to OFF at time it2 after passing an ON period Ton, an output command voltage Voc is once suddenly reduced to an OFF-period bottom value Vbott lower than a value VB1 which is suitable for maintaining a base discharge current when laser gas is cold, and then is increased to the value VB1 in a period τ. Thus, the actual output is permitted to be instantly interrupted without stopping the discharge. Vbott is a function of $\eta=(Pc/Pmax)\times$Beam ON period, and is gradually reduced to a lower-limit clamp value VB2. $Vbott(\eta)=VB1-[(VB1-VB2)/\eta B2]\eta$ (where $0\leq\eta\leq\eta B$), $Vbott(\eta)=VB2$ (where $\eta>\eta B$). In the equations, Pc is a laser output during the beam ON period, Pmax is a maximum rated laser output, and $\eta B2$ is a value of $\eta$ when $Vbott(\eta)$ is reduced to VB2.

15 Claims, 12 Drawing Sheets

GAS DISCHARGE EXCITATION LASER DEVICE

TECHNICAL FIELD

The present invention relates to a gas discharge excitation laser device, and more particularly, to a gas discharge excitation laser device having an improved a response to a switching-off command of a beam output.

BACKGROUND ART

Generally, in laser devices to obtain a laser output by gas discharge excitation, there is a relationship such that a larger amount of electric power input for the gas discharge provides a higher laser output and a smaller input provides a lower laser output. However, the relationship between the amount of power input and the laser output is not in direct proportion and is affected by the temperature of laser gas. This relationship is illustrated in FIG. 2 with a horizontal axis indicating an amount of power input for gas discharge in terms of discharge current (A: ampere) and the vertical axis indicating a laser output (W: watt).

As indicated by the solid line in the graph of FIG. 2, while the laser gas is cold, no laser oscillation takes place within a range H1 of discharge current from "0" to a threshold indicated by point P, and once the discharge current exceeds the threshold indicated by the point P, the laser output increases linearly with the discharge current. On the other hand, while the laser gas is hot, the threshold for laser oscillation drops to a level indicated by point Q, as shown by the broken line in the graph of FIG. 2. The expression "cold" used here means a state of "ordinary temperature or thereabouts" and is typified by a temperature range of 280 to 320 K (7 to 47° C.). Also, the term "hot" means a state of "sufficiently higher temperature than ordinary temperature" and is typified by a temperature range of 400 to 500 K (127 to 227° C.).

The characteristic in the vicinity of the point Q to P (range H2) is in actuality considerably unstable and it is not certain whether laser oscillation actually takes place at an arbitrary point (e.g., point S1) within the range H2. In general, in a case where a laser output command is switched from ON to OFF and thus the discharge current value drops from a high value (e.g., point S2) to a lower value point within the range H2), the laser oscillation shows a tendency to continue, as described later.

As the discharge current becomes much larger than the threshold indicated by the point Q, the discharge current/laser output characteristic gradually becomes closer to that (solid line) as observed while the laser gas is cold. Symbol W1 in the graph represents a laser output while the laser gas is hot in supplying a discharge current equivalent to the threshold while the laser gas is cold, and W1>0.

In actually using a gas discharge laser, such control is performed as to switch between an OFF state in which a small discharge current called base current is supplied and an ON state in which a current to obtain a laser output required for machining or the like is supplied. In pulse operation mode, the two states are periodically and repeatedly alternated.

To smoothly carry out such control operation, it is necessary to set the base current to an appropriate value. If the base current value is set to a small value close to "0" as indicated by symbol R in FIG. 2, it is expedient for the laser output to be surely switched to the OFF state, but lowering of the gas temperature is unavoidable, making it difficult to maintain the gas discharge state. Once the gas discharge state is lost, special control is required again to restore gas discharge.

Specifically, it is necessary to apply a voltage much higher than that required to maintain the gas discharge state for inducing the gas discharge, and to control transition to the gas discharge-maintained state. It is apparently disadvantageous to perform such complicated and time-consuming control operation each time the laser is switched on and off.

Usually, therefore, the base current value is set to a value close to the point P (represented by the point S1). While a command to turn the laser output to the OFF state is output from a control section after the start of discharge, the gas discharge is maintained by supplying the base current set at the point S1, and when a command to turn the laser output to the ON state is output, a discharge current (represented by S2) large enough to obtain a required laser output W2 is supplied. In the pulse operation mode, the discharge current is controlled to be periodically altered between the points S1 and S2.

If the point S1 indicative of the base current is set at a value close to the point P, there arises a problem that the point S1 falls within the range H2 between the points Q and P. While the temperature of the laser gas is low, ON/OFF of an actual laser output (hereinafter referred to as "actual output") accurately responds to ON/OFF of the output command because the point S1 is closer to the origin than the point P. However, as the temperature of the laser gas rises due to a long-term operation or a high-output operation, the point Q indicative of the threshold for the actual output is shifted to the point S1 or to a position closer to the origin than the point S1, thereby accurate response of ON/OFF of the actual output to ON/OFF of the output command is not maintained.

In the range H2 from the point Q to the point P, the characteristic is considerably unstable as mentioned before, and the practical problem is that the actual output does not immediately become "0" when the laser output command is turned from ON to OFF.

Two charts in FIG. 3 illustrate a general relationship between the output command and the actual output observed in a situation where the above phenomenon has occurred. The horizontal axes in these upper and lower charts indicate the common time t (sec), the vertical axis in the upper chart indicates a voltage (Voc (mV) of the output command) for controlling the discharge current, and the vertical axis in the lower chart indicates the laser output W (watt).

As shown in the upper chart, the laser output control following the start of discharge is performed by switching the output command voltage Voc between two levels V1 and V2 as time elapses. For the pulse operation, the switching between V1 and V2 is repeated at shorter intervals. V1 represents a voltage of the output command for OFF, and is set to a value slightly smaller than a standard threshold Vth for laser oscillation (which corresponds to the point P in the graph of FIG. 2). A voltage V2 of the output command for ON is set to a value for obtaining the required laser output W2 (which corresponds to the point S2 in the graph of FIG. 2).

When the output command voltage Voc is applied as shown in the upper chart, the laser output generally changes as indicated in the lower chart. Specifically, when the output command voltage is turned from V1 to V2 at time ta, the laser output immediately rises. While the output command voltage is kept at V2 (e.g. at time tb), the laser output is substantially maintained at the fixed value W2.

However, when the output command voltage is then altered from V2 to V1 at time tc, the laser output does not immediately cease but trails to time td which can not be regarded as equivalent to tc, as indicated by symbol G. Thus, the laser oscillator with the conventional method of control is inadequate in actual output response to the laser oscillation stopping command, to cause a machining deficiency in laser beam machining, for instance.

DISCLOSURE OF INVENTION

An object of the present invention is to provide a gas discharge excitation laser device with an improved response of actual output to a laser oscillation stopping command, to thereby remove a cause of machining deficiency in laser beam machining, for instance.

A gas discharge excitation laser device according to the present invention comprises a gas discharge tube for performing laser excitation of a laser medium to obtain a laser output, power supply means for supplying electric power to the gas discharge tube, and control means for controlling the power supply means. The control means outputs, to the power supply means, an ON command to turn the laser output to an ON state by subjecting the laser medium to laser excitation by means of discharge of the gas discharge tube and an OFF command to turn the laser output to an OFF state without stopping the discharge of the gas discharge tube. The OFF command causes the power supply means to supply the gas discharge tube with a bottom power smaller than OFF-period reference power which is suitable for maintaining a base discharge current when gas in the gas discharge tube is cold, and then increases the electric power supplied from the power supply means to the gas discharge tube.

The bottom power supplied at the time of transition from the ON state to the OFF state may be determined in accordance with an index $\eta$ indicative of increase in temperature of the laser gas in the gas discharge tube. The value of the index $\eta$ may be calculated based on the product of the magnitude of the laser output and a laser beam ON period.

The magnitude of the electric power supplied from the power supply means to the gas discharge tube is controlled in accordance with an output command voltage signal included in the ON and OFF commands output from the control means to the power supply means.

An OFF-period bottom value Vbott($\eta$), which is an output command voltage for supplying the bottom power to the gas discharge tube, may be determined by a polygonal-line function of the index $\eta$ indicative of increase in temperature of the laser gas in the gas discharge tube, as follows:

$$Vbott(\eta)=VB1-[(VB1-VB2)/\eta B2]\eta \quad (0 \leq \eta \leq \eta B)$$

$$Vbott(\eta)=VB2 \quad (\eta > \eta B)$$

where VB1: an output command voltage value suitable for maintaining the base discharge current when the laser gas is cold;

VB2: a clamp value defining a lower limit on the OFF-period bottom value Vbott($\eta$); and $\eta$B2: a value of $\eta$ when Vbott($\eta$) is reduced to the lower-limit clamp value VB2.

It is preferable that the values VB1, VB2 and $\eta$B2 be variably set. The index $\eta$ can be determined according to the following equation:

$$\eta=(Pc/Pmax)\times\text{Beam ON period}$$

where Pc: a laser output during the beam ON period; and

Pmax: a maximum rated laser output.

The increase of the electric power supplied to the gas discharge tube, which is started immediately after the transition from the ON state to the OFF state, is preferably continued until the power reaches the OFF-period reference power. Where the magnitude of the electric power to be supplied is controlled by means of the output command voltage, such increase of the power supply is achieved by varying the output command voltage from the OFF-period bottom value Vbott($\eta$) to the OFF-period reference value VB1.

Also, the time period necessary for reaching the OFF-period reference power, that is, a time period $\tau$ necessary for the output command voltage to vary from the OFF-period bottom value Vbott($\eta$) to the OFF-period reference value VB1, may be set in advance.

In the case of pulse operation of the gas discharge excitation laser device, an output value of a signal for supplying the bottom power from the power supply means to the gas discharge tube, typically the OFF-period bottom value Vbott($\eta$), may be determined prior to the start of each laser output according to the pulse operation.

BEST MODE OF CARRYING OUT THE INVENTION

Figure 1:
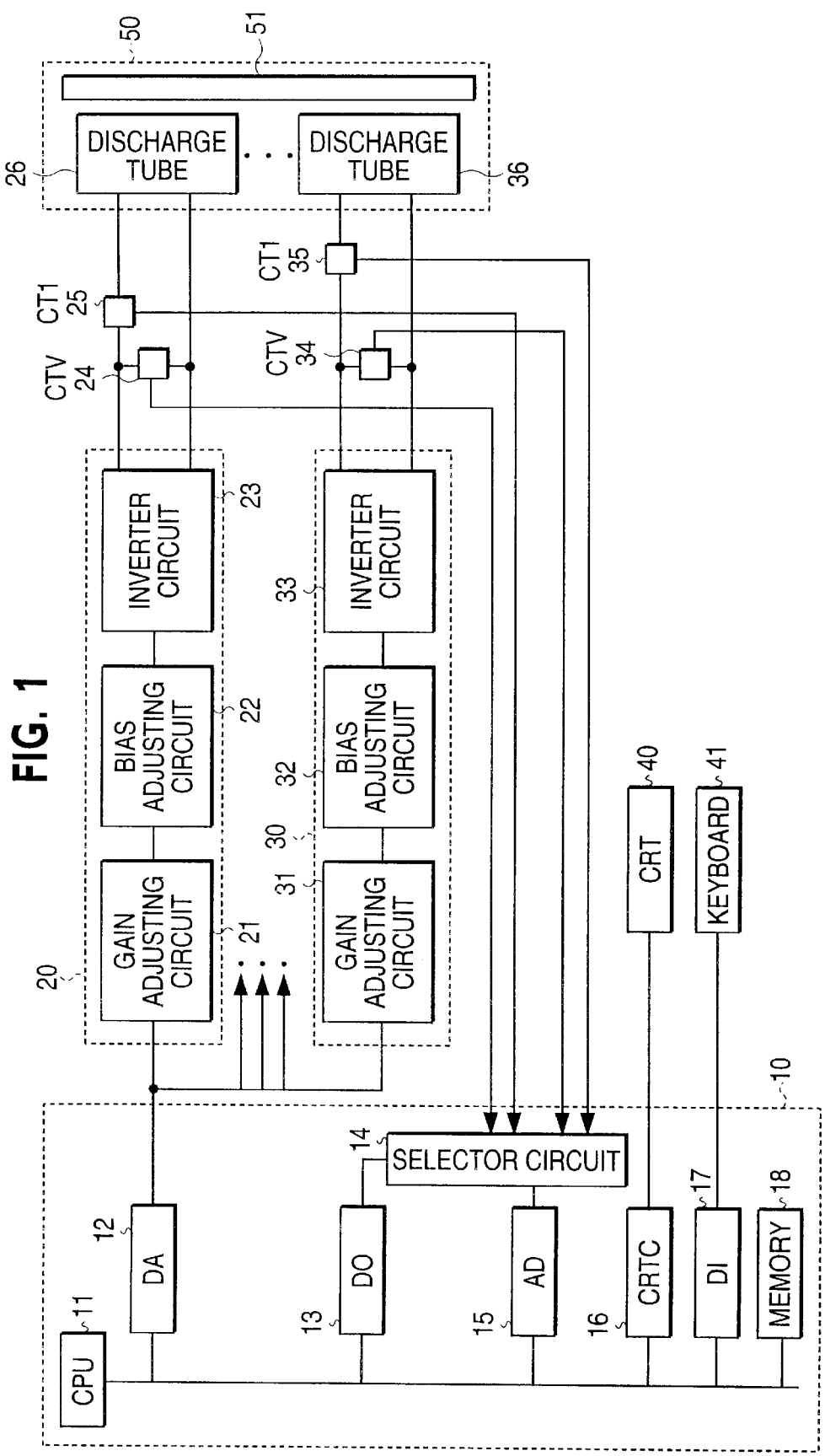
FIG. 1 is a block diagram showing a hardware structure of a principal part of a gas discharge excitation laser device according to an embodiment of the present invention.

FIG. 1 is a block diagram showing a principal part of a hardware structure according to an embodiment of the present invention. A CNC (numerical control device) 10 constituting output control means for a laser device has a CPU (central processing unit) 11 including a microprocessor. The CPU is connected to a DA converter 12, an output circuit 13, an AD converter 15, a CRT control circuit 16, an input circuit 17 and a memory 18, via a bus.

The output circuit 13 is connected to a control input section of a selector circuit 14, and the AD converter 15 is connected to an output section of the selector circuit 14. The selector circuit 14 is connected to voltmeters (CTV) 24, . . . , 34 and ammeters (CTI) 25, . . . , 35 for respectively detecting voltages and currents supplied to corresponding gas discharge tubes 26, . . . , 36 (usually, one tube to several tubes) which excite a laser medium 51 in a main body 50 of the laser device.

The selector circuit 14 outputs the outputs of the voltmeters (CTV) 24, . . . , 34 and ammeters (CTI) 25, . . . , 35 successively to the AD converter 15 in accordance with a control input. To the CRT control circuit 16 and the input circuit 17 are respectively connected a CRT 40 and a keyboard 41 as external devices. The former external device is used for displaying data indicating control conditions, operating states, etc. of the laser device, while the latter is used as manual input means for the entry of commands such as an operation start or end command for the laser device, and is also used for the entry, registration, modification and the like of program data, parameters, etc. that determine the contents of control for the laser device.

A power supply section which constitutes means for supplying electric power to the individual gas discharge tubes 26, . . . , 36 includes laser power supplies 20, . . . , 30 corresponding in number to the gas discharge tubes 26, . . . , 36. The laser power supplies 20, . . . , 30 have principal parts thereof constituted by gain adjusting circuits 21, . . . , 31, bias adjusting circuits 22, . . . , 32, and inverter circuits 23, . . . , 33. The gain adjusting circuits 21, . . . , 31 are circuits for adjusting the amplification factors of respective discharge currents, and the bias adjusting circuits 22, . . . , 32 are circuits for adjusting output voltages at which the respective discharge tubes 26, . . . , 36 start discharge. The inverter circuits 23, . . . , 33 each serve as a circuit for converting a direct current to a high-frequency alternating current.

The memory 18, which collectively indicates a set of ROM, RAM and nonvolatile memory, stores various set values and various programs including those defining processes for controlling an output command voltage in modes described later, and is also used to temporarily store data for calculation processes.

A command manually input through the keyboard or an output command output from the CPU 11 when, for example, a program is started is converted into an output command voltage (mV) via the DA converter 12 and the gain thereof is adjusted while passing through the gain adjusting circuits 21, . . . , 31. Further, during passage through the bias adjusting circuits 22, . . . , 32, an offset bias value is adjusted, the adjusted value being supplied to the inverter circuits 23, . . . , 33.

The output of a suitable direct-current power supply (not shown) is applied to the discharge tubes 26, . . . , 36 for discharge via the gain adjusting circuits 21, . . . , 31, the bias adjusting circuits 22, . . . , 32 and the inverter circuits 23, . . . , 33 of the laser power supplies 20, . . . , 30. From the point of time when the discharge tubes 26, . . . , 36 start discharge, the high-frequency currents output from the inverter circuits 23, . . . , 33 are used for the discharge. The above-described hardware configuration itself is not novel in particular, and the present invention is characterized in the manner of how the output command voltage is caused to undergo transition as explained hereinafter.

Figure 4:
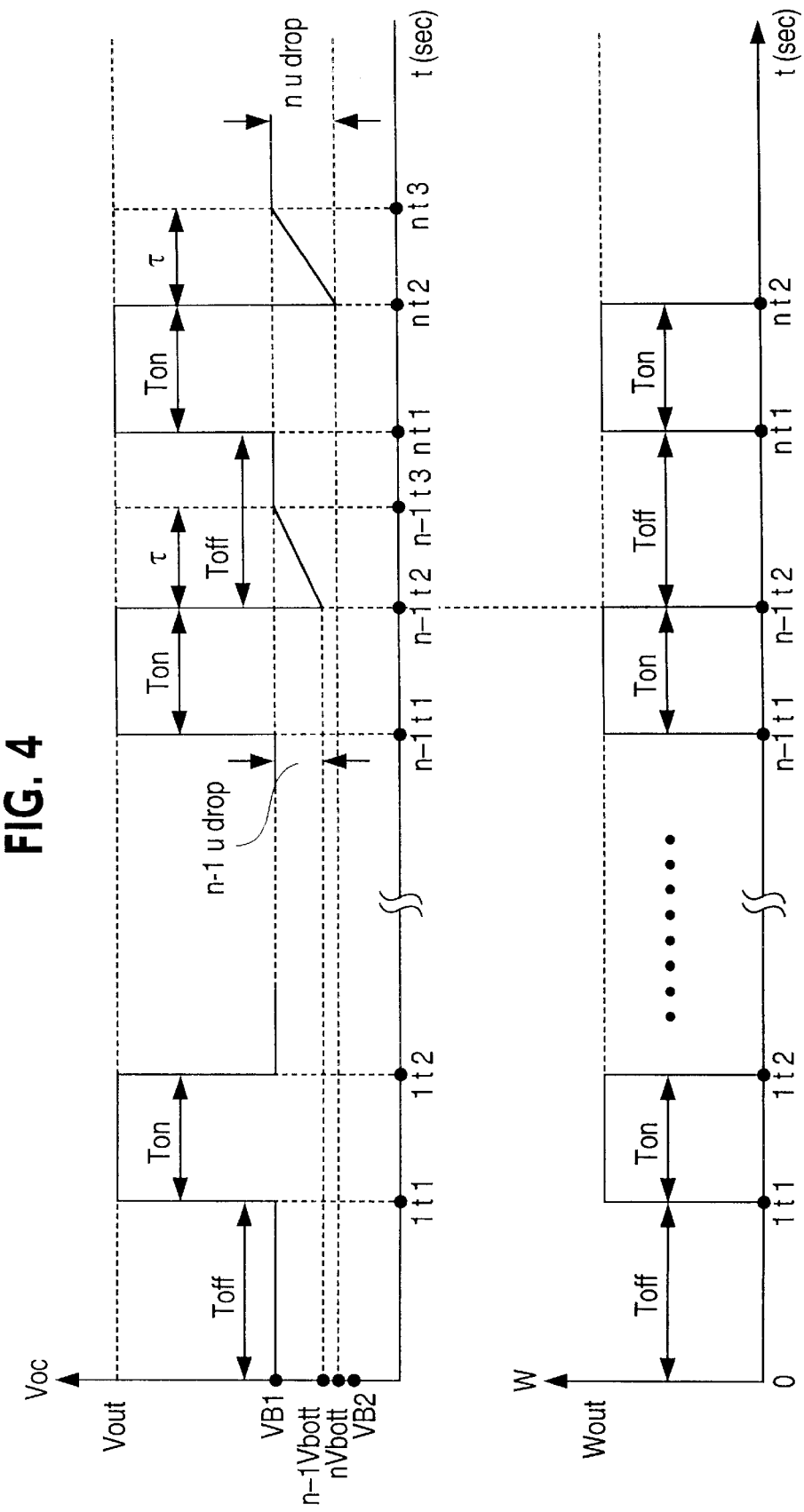
FIG. 4 shows charts illustrating the relationship between an output command voltage and an actual output according to an embodiment of the present invention.

FIG. 4 shows two charts illustrating the relationship between the output command voltage (output voltage of the DA converter 12) and the actual output according to the embodiment. The horizontal axes indicate common time t (sec) in the upper and lower charts, the vertical axis in the upper chart indicates the output command voltage Voc, and the vertical axis in the lower chart indicates a laser output W (watt). It is assumed that an origin (t=0) of time t in the two charts coincides with the end of control operation for the start of laser gas discharge (it should be noted that the origin does not represent the start of oscillation of the laser device). The control operation for the start of laser gas discharge is briefly mentioned before, and since it scarcely has direct relation with the gist of the present invention, detailed description thereof is omitted.

In the following description of the embodiment, a procedure for attaining an actual output transition shown in the lower chart will be explained referring to the upper chart. The lower chart indicates the actual output transition in which an OFF state of the actual output continuing for a fixed period Toff and an ON state of the actual output continuing for a fixed period Ton are alternately repeated, and two points as mentioned below are important. In addition, it should also be noted that the operation pattern in this embodiment is periodic. The period is not so short as to fall under the category of the pulse operation, and therefore the OFF period Toff and the ON period Ton are much longer than the ITP (processing period) of the CPU 11.

Figure 2:
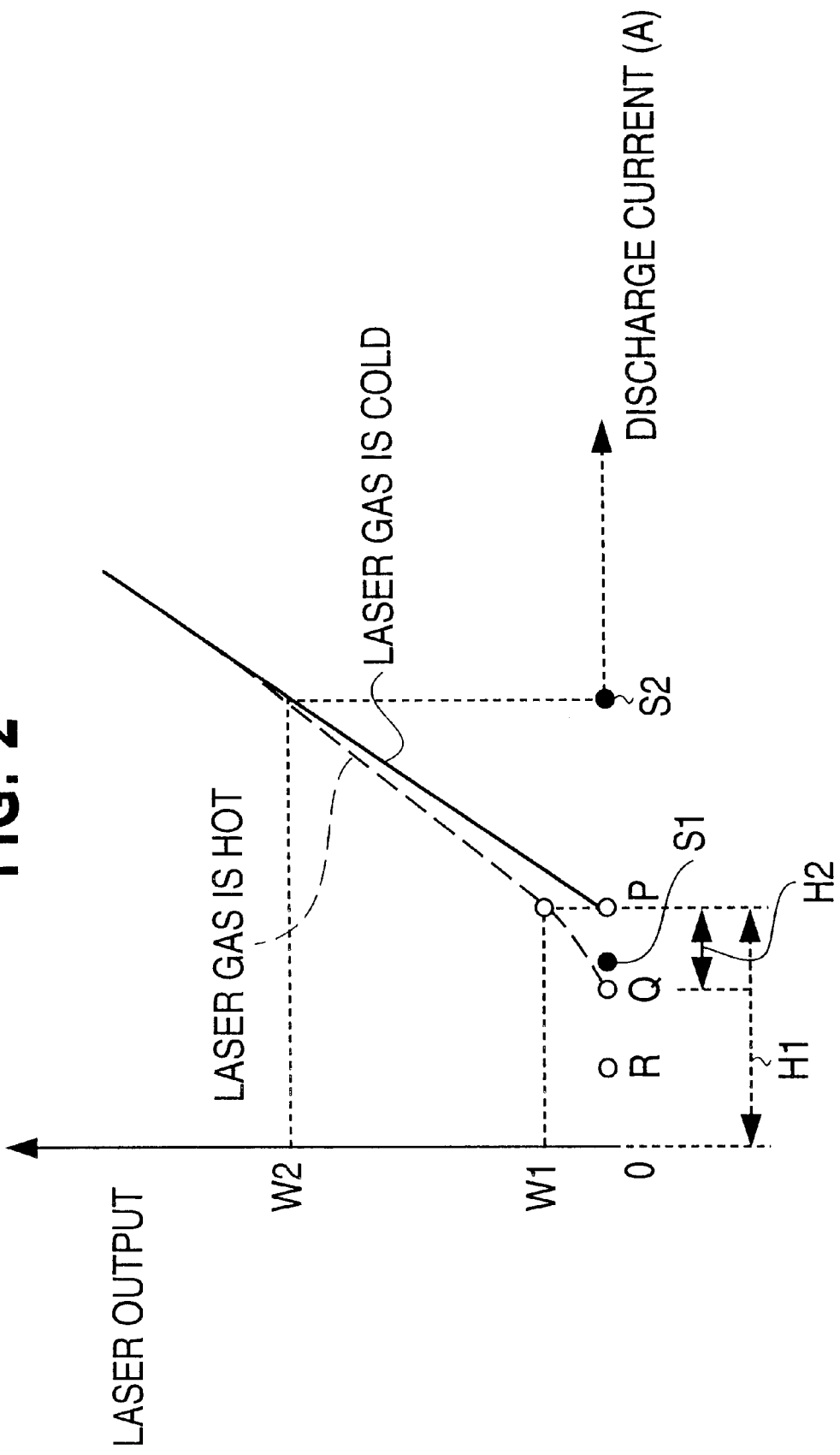
FIG. 2 is a graph showing a general relationship between power input amount and laser output of a gas discharge laser.

(1) Even when the laser gas is heated, a transitional trail of the laser output (see lower chart of FIG. 3; symbol G in FIG. 2) as observed in the conventional art does not occur at the time of transition from the actual output ON state in which a predetermined required laser output Wout is maintained, to the actual output OFF state.

(2) The timing ($1t2, \ldots, n-1t2, nt2, \ldots$) of transition from the actual output ON state to the actual output OFF state coincides with the timing of ON-to-OFF transition of the output command.

As mentioned before referring to the conventional art, if the output command voltage Voc is turned from a value Vout for the ON command to a value VB1 for the OFF command at the time of ON-OFF transition if is difficult to stably maintain the above-mentioned response of the actual output to the command output. Specifically, if the temperature of the laser gas has risen due to long-term operation or high-output operation, the transition to the actual output OFF state (W=0) does not take place instantly when the command output is turned OFF.

Figure 3:
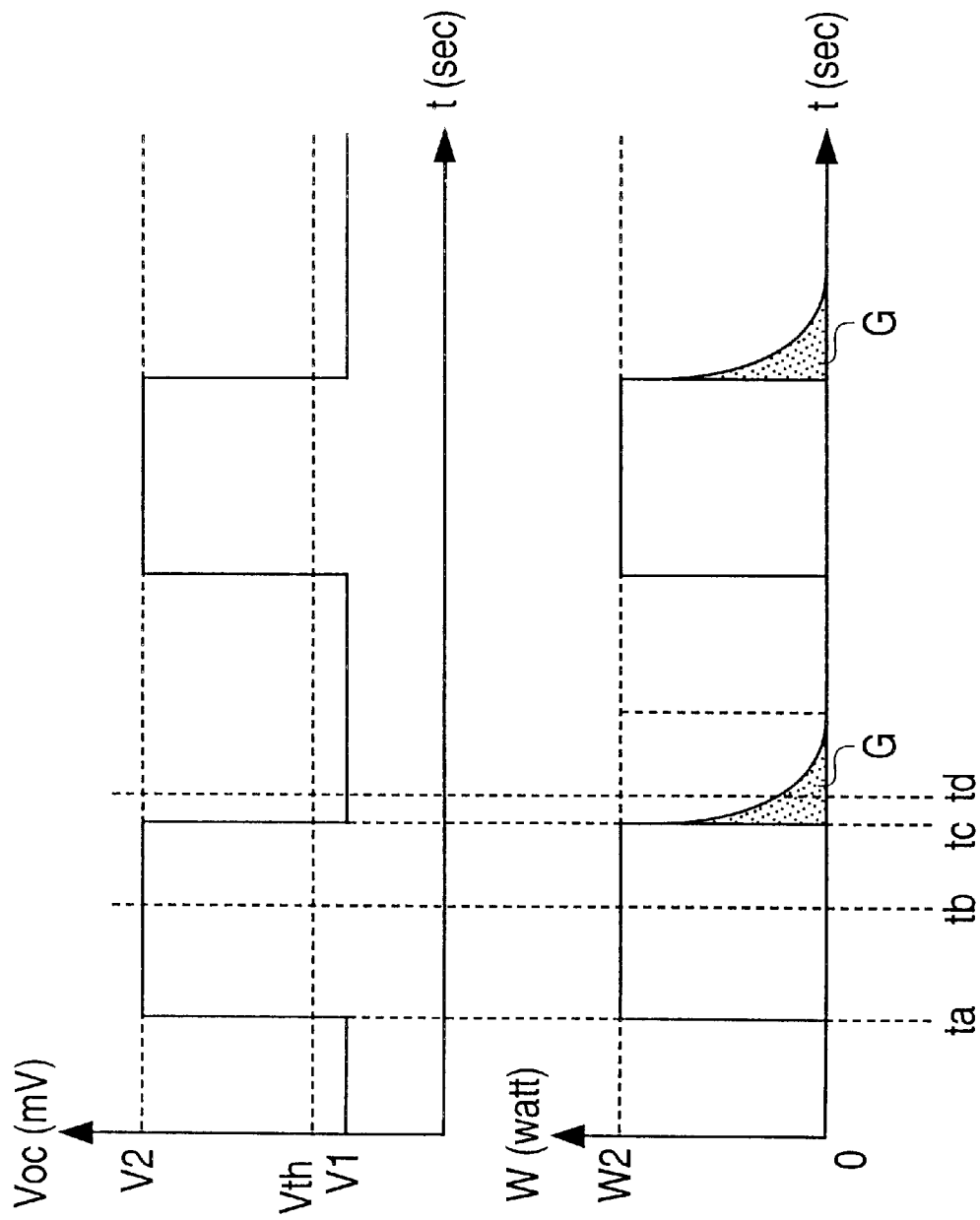
FIG. 3 shows charts illustrating a problem associated with conventional art.

The voltage value VB1 of the command output here is equivalent to V1 shown in the upper chart of FIG. 3, and is generally selected to be a value suitable for maintaining the base discharge current while the laser gas is cold. More specifically, the value VB1 is slightly smaller than an oscillation threshold Vth for the case where the laser gas is cold. In the following description, the output command voltage value VB1 is appropriately referred to as "OFF-period reference output command voltage value" or "OFF-period reference value" for convenience sake, and a supply power corresponding thereto is referred to as "OFF-period reference power".

To avoid the aforementioned situation (deterioration of the response of the actual output in turning OFF), this embodiment employs the technical concept of the present invention, that is, control is performed in such a manner that, when the command output is turned from ON to OFF, the output command voltage Voc is once suddenly reduced to an OFF-period bottom value Vbott (output command voltage for bottom power supply) smaller than the set value VB1 which is set suitable for maintaining the base discharge current when the laser gas is cold, and the output command voltage Voc is thereafter restored (increased) to the set value VB1. Such a sudden drop to the OFF-period bottom value Vbott makes it possible to instantaneously and surely interrupt the laser oscillation (actual output).

In this case, care needs to be taken that, if the above control is carried out immediately after the start of laser operation, the OFF-period bottom value Vbott is set to an excessively low value while the temperature of the laser gas is low, possibly causing a difficultly in maintaining the discharge.

Therefore, the OFF-period bottom value Vbott of the output command voltage which is applied to the ON→OFF transition is gradually reduced as an integrated value of the oscillation period increases. However, considering that excessive reduction of the OFF-period bottom value Vbott apparently makes it difficult to maintain the discharge, the value Vbott is not reduced below an appropriate lower-limit clamp value VB2.

The output command voltage Voc is not held at the OFF-period bottom value Vbott but is restored (increased) to the set value VB1 because, if the output command voltage Voc is made to remain at the bottom value, there is a possibility that difficulty arises in maintaining the discharge. Namely, in this embodiment, the output command voltage Voc is gradually (in this embodiment, linearly) increased from the OFF-period bottom value Vbott to the OFF-period reference value VB1 in an appropriate time period τ (rise time period), as shown in the upper chart in FIG. 4.

Provided that the OFF-period bottom value of the output command voltage applied at the time of an i-th (i=1, 2, ..., n−1, n, ...) ON→OFF switching of the command is iVbott and that the amount of reduction of the output command voltage measured from VB1 as a reference value is iVdrop, as shown in the upper chart of FIG. 4, the following relationships are fulfilled:

$$iVbott=VB1-iVdrop \leq VB2 \ (i=1, 2, \ldots, n-1, n, \ldots) \quad (1)$$

$$0<iVdrop \leq VB1-VB2 \ (i=1, 2, \ldots, n-1, n, \ldots) \quad (2)$$

$$iVbott \geq i+1Vbott \ (i=1, 2, \ldots, n-1, n, \ldots) \quad (3)$$

$$iVdrop \leq i+1Vdrop \ (i=1, 2, \ldots, n-1, n, \ldots) \quad (4)$$

In the above expressions (3) and (4), the equal sign applies after iVdrop reaches the lower-limit clamp value VB2.

A variety of transition patterns with which the OFF-period bottom value iVbott is gradually reduced toward the lower-limit clamp value VB2 may be applied. In this embodiment, a transition pattern expressed by a polygonal-line function of an integrated laser oscillation period, as shown in the graph of FIG. 5, is employed.

Figure 5:
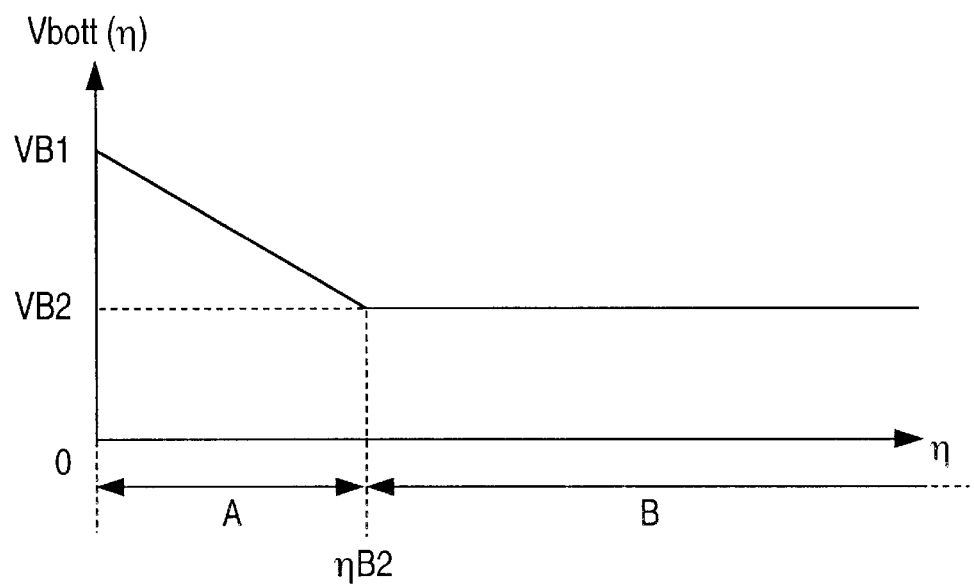
FIG. 5 is a graph showing an example of gradual reduction pattern of an OFF-period bottom value.

In the graph of FIG. 5, the horizontal axis indicates a variable η defined by equation (5) below, and the vertical axis indicates an OFF-period bottom value, Vbott(η) of the output command voltage to be determined with respect to η. The variable η serves as an index indicative of the degree of increase in the temperature of the laser gas.

$$\eta = (Pc/Pmax) \times \text{Beam ON Period} \quad (5)$$

The polygonal-line function shown in FIG. 5, which is defined with respect to the variable η, is expressed by the following equations (6) and (7):

$$Vbott(\eta)=VB1-[(VB1-VB2)/\eta B2]\eta \quad (6)$$

where $0 \leq \eta \leq \eta B$ (indicated by range A in FIG. 5).

$$Vbott(\eta)=VB2 \quad (7)$$

where $\eta > \eta B$ (indicated by range B in FIG. 5).

Various symbols in the above equations represent the following quantities:

Pc: A laser output during the beam ON period;

Pmax: A maximum rated laser output (which varies depending on device type); and

ηB2: A value of η when Vbott(η) is reduced to VB2. In other words, ηB2 is a minimum value of η that satisfies Vbott(η)=VB2.

Integration of the beam ON period is started from t=0 in the charts of FIG. 4. This definition is applied to the beam ON pattern shown in the lower chart of FIG. 4, whereupon a value ηi of η at the time it2 of the i-th base current control is given by the following equation (8):

$$\eta i = iTon(Wout/Pmax) \quad (8)$$

From the equations (8) and (6), an OFF-period bottom value iVbott of the output command voltage at the time it2 of the i-th base current control is given by equation (9) below.

$$iVbott=VB1-[(VB1-VB2)iTon(Wout/Pmax)/\eta B2] \quad (9)$$

Various quantities mentioned below are stored beforehand in the memory 18 of the CNC 10.

Pmax: The maximum rated laser output. It is preferable that this value be determined appropriately based on data in the specifications, actual measurement data, etc. because it varies depending on the device type.

VB1: The output command voltage value suitable for maintaining the base discharge current while the laser gas is cold. This value corresponds to the OFF-period bottom value of the output command voltage which is applied when the base discharge current control according to the present invention is not performed. It is preferable that the value be set to a value slightly smaller than the oscillation threshold Vth (see FIG. 2) applicable to the case where the laser gas is cold.

VB2: The clamp value defining the lower limit on the OFF-period bottom value Vbott. It is preferable that this value be set to a value as small as possible to an extent such that there is no hindrance to the maintenance of the gas discharge under the condition that the laser gas is sufficiently hot. Naturally, VB2<VB1.

ηB2: The value of n when Vbott(η) is reduced to the lower-limit clamp value VB2. Provided that a beam ON period necessary for the laser gas to become sufficiently hot is tst, ηB2 may be set taking account of the value tstPc/Pmax obtained by substituting tst into the equation (5).

τ: The time period elapsed up to the point of time when the output command voltage Voc is restored (increased) to VB1 from Vbott. Generally, the time period is set to a period shorter than the OFF period Toff. This, however, does not apply to the pulse operation (in which Toff is very short and Toff as the pulse interval is equal to τ), as described later.

Referring additionally to the flowcharts of FIGS. 7 through 10, a processing for attaining the Voc transition as shown in the upper chart of FIG. 4, which is premised on the foregoing, will be explained. The entire processing consists of processes 1 through 4, wherein the processes 1 to 3 are tasks executed concurrently in, parallel with one another and the process 4 is a part (subroutine) of the process 3.

The process 3 (FIG. 9) for integrating the beam ON period will be described first for simplicity of explanation. The process 3 is a process in which a beam ON period integration timer (timer register) set in the memory 18 of the CNC 10 is switched ON and OFF in accordance with the value of a flag F1 which distinguishes between a beam ON state and a beam OFF state (F1=1: beam ON; F1=0: beam OFF), and individual Steps S31 through S37 are summarized below. A flag F2 serves to distinguish between ON and OFF states of power supply to a discharge lamp (F2=1; power supply ON; F2=0: power supply OFF).

[S31] The integration timer is cleared at the start of operation.

[S32] On confirming that the relationship F2=0 is not fulfilled, the procedure proceeds to S33. If F2=0, then it means the end of operation, and accordingly, the process is terminated.

[S33] It is determined whether or not the relationship F1=0 is satisfied. If F1=0, it means that the beam is OFF, and therefore, Step S32 is repeatedly executed to check for the value of F2 until the flag F1 is inverted. If, in the process of the checking, the relationship F2=0 becomes fulfilled, the process is terminated. When F1=1 is satisfied, it means that the beam is ON, and thus the procedure proceeds to Step S34.

[S34] The integration timer is switched ON.

[S35] On confirming that the relationship F2=0 is not fulfilled, the procedure proceeds to S36. If F2=0, the process is terminated.

[S36] It is determined whether or not the relationship F1=0 is fulfilled. If F1=0, it means that the beam is OFF, and accordingly, the procedure proceeds to Step S37. If F1=1, then it means that the beam ON state is continued, and therefore, Step S35 is repeatedly executed to check for the value of F2 until the flag F1 is inverted. If, in the process of the checking, the relationship F2=0 becomes satisfied, the process is terminated.

[S37] The integration timer is switched OFF, and the procedure returns to Step S32.

The above process makes it possible to store the integrated value of the beam ON period in the memory 18 of the CNC 10 on a realtime basis.

Individual Steps S11 through S18 of the process 1 (FIG. 7) for determining an operation pattern are summarized below. In the following, it is assumed that the process is executed immediately after completion of a startup process, and therefore, the initial values of the flags are as follows: F1=0 (beam OFF); F2=1 (power supply ON).

[S11] On confirming that an operation end command is not output, the procedure proceeds to S12. If the operation end command is output, the procedure proceeds to Step S18 to invert the flag F2. Although the operation end timing is not illustrated in the charts of FIG. 4, the operation end command is output in response to, for example, an operation end instruction in an operation program, an external input, a manual input, an emergency stop, etc.

[S12] In order to maintain the beam OFF state for the OFF period Toff prior to the beam-ON in individual cycles including the first cycle, as shown in the charts of FIG. 4. Step S11 is repeatedly executed to check for the output of the operation end command until the period Toff elapses, and then the procedure proceeds to Step S13. If, in the process of the checking, the operation end command is output, the procedure proceeds to Step S18.

[S13] To switch the beam ON, the flag F1 is inverted, that is, F1=1.

[S14] On confirming that no operation end command is output, the procedure proceeds to S15. If the operation end command is output, the procedure proceeds to Step S17.

[S15] While repeatedly executing Step S14, whether or not the beam ON period Ton has elapsed is determined, and when the period Ton has elapsed, the procedure proceeds to Step S16. If the operation end command is output in the middle, the procedure proceeds to Step S17. [S16] To switch the beam OFF, the flag F1 is inverted, that is, F1=0, and procedure returns to Step S11.

[S17] To switch the beam OFF, the flag F1 is inverted, that is, F1=0, and the procedure proceeds to Step S18.

[S18] To switch OFF the power supply to the gas discharge tube, the flag F2 is inverted, that is, F2=0 and the process is ended.

The following is a summary (Steps S21 through S27) of the process 2 (FIG. 8) for outputting the output command voltage Voc according to the transition pattern as shown in the upper chart of FIG. 4, which process is executed concurrently with the process 1. The initial value of the output command voltage Voc is set to VB1 (OFF-period reference output command voltage value), that is, Voc=VB1, for the same reason as stated above with reference to the process 1.

[S21] On confirming that the relationship F2=0 is not fulfilled, the procedure proceeds to S22. If F2=0, then it means the end of operation, and in this case, the procedure proceeds to Step S27 to set Voc to zero, that is, Voc=0.

[S22] It is determined whether or not the relationship F1=0 is fulfilled. If F1=0, it means that the beam is OFF; therefore. Step S21 is repeatedly executed to check for the value of F2 until the flag F1 is inverted. If the relationship F2=0 becomes fulfilled in the middle, the procedure proceeds to Step S27. When the relationship F1=1 is satisfied, it means that the beam is ON, whereupon the procedure proceeds to Step S23.

[S23] The output command voltage value is switched from the OFF-period reference value VB1 to the command value Vout for the ON period.

[S24] On confirming that the relationship F2=0 is not fulfilled, the procedure proceeds to S25, If F2=0, the procedure proceeds to Step S27.

[S25] It is determined whether or not the relationship F1=0 is fulfilled. If F1=0, then it means that the beam is OFF, and accordingly, the procedure proceeds to Step S26. If F1=1, it means that the beam ON state is continued, in which case Step S24 is repeatedly executed to check for the value of F2 until the flag F1 is inverted. If the relationship F2=0 becomes fulfilled in the middle, the procedure proceeds to Step S27.

Figure 10:
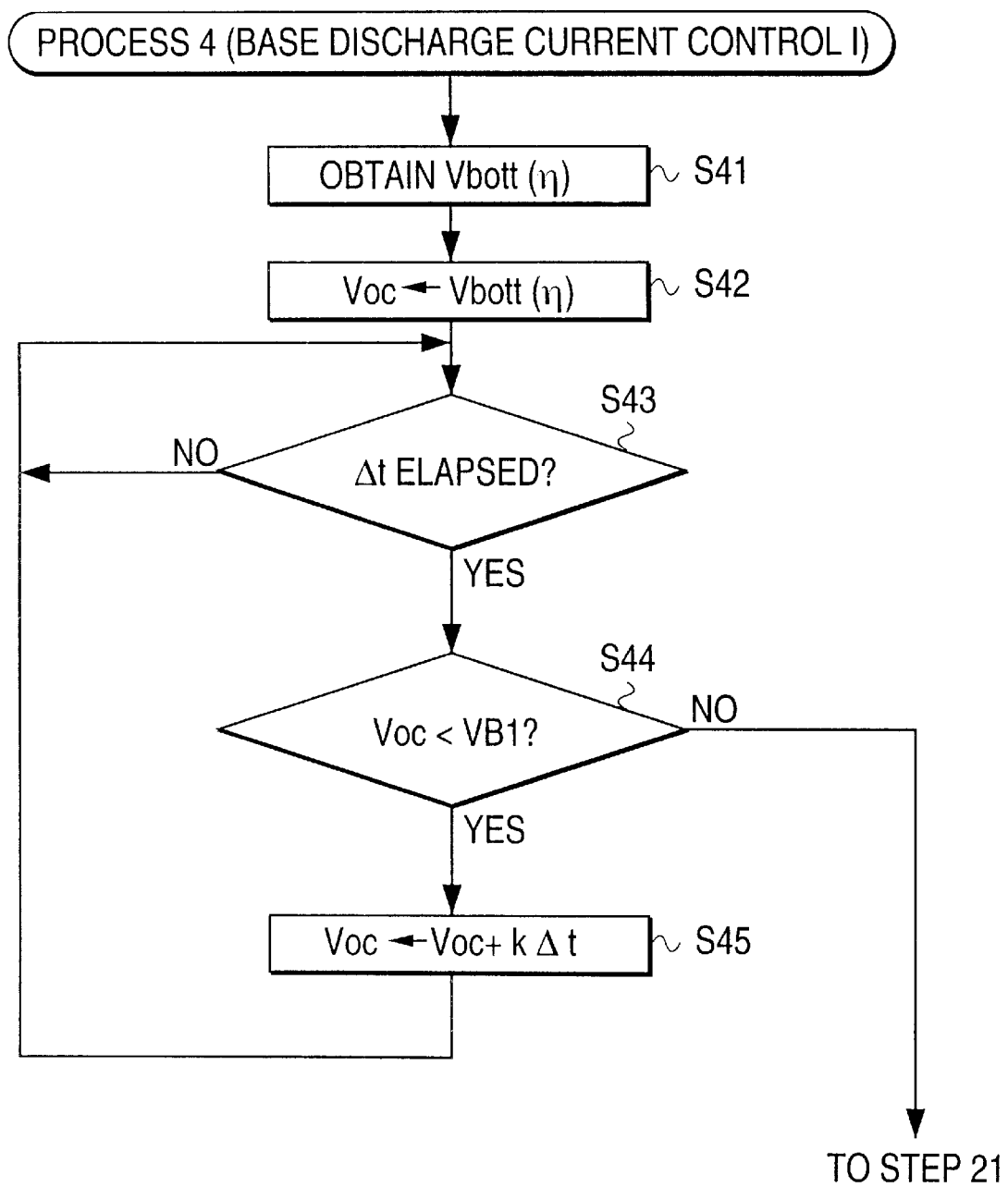
FIG. 10 is a flowchart showing an outline of process 4 for base discharge current control I.

[S26] A process (base discharge current control I) for controlling the base discharge current in the aforementioned mode is executed, and the procedure returns to Step S21, In this process, as described in detail later with reference to the process 4 (see FIG. 10). Voc is once reduced to the OFF-period bottom value Vbott, is then increased up to the OFF-period reference value VB1 in the time period τ, and is thereafter maintained at the OFF-period reference value VB1, as shown in the upper chart in FIG. 4.

The following is a summary (Steps S41 to S45) of the base discharge current control I (FIG. 10) executed in Step S26 of the process 2.

[S41] Using the set values such as VB1, VB2, $\eta$B2, Pmax, etc., the laser output Wout corresponding to Vout, and the value of the integration timer (see process 3), the calculations indicated by the aforementioned equations (6) and (7) are performed to obtain the OFF-period bottom value Vbott ($\eta$). As stated above, in the operation pattern shown in the charts of FIG. 4, the value Vbott($\eta$i) of Vbott($\eta$) applied at the time it2 of the i-th base current control is given by the aforementioned equation (9).

[S42] The OFF-period bottom value Vbott(η), that is, Vbott(ηi) obtained by the latest execution of Step S41, is set as the output command voltage Voc.

[S43] The procedure waits for a time period Δt to elapse. The time period Δt represents a very short period of time which is an integral multiple of the ITP (processing period) of the CPU, and is considerably shorter than the rise time period τ.

[S44] On confirming that the output command voltage Voc is lower than (not yet restored to) the OFF-period reference value VB1, the procedure proceeds to Step S45. If Voc has been restored to VB1, the process 4 is ended and the procedure returns to Step S21 of the process 2.

[S45] The output command voltage Voc is set to a value higher than the current Voc value by a very small amount kΔt, and the procedure returns to Step S41. Symbol k denotes a coefficient determining the gradient at which the output command voltage is restored from the OFF-period bottom value Vbott(η) to the OFF-period reference value VB1, and where the rise time period τ has been set. k is expressed by equation (10) below. In the equation, Vbott(η) is the OFF-period bottom value obtained by the latest execution of Step S41 and, at the time of the i-th base current control, takes the value Vbott(η) given by the aforementioned equation (9).

$$k=[VB1-Vbott(\eta)]/\tau \qquad (10)$$

After the time period τ elapses following the output of Vbott(η), the processing cycle of Steps S41 through S45 is executed a number of times corresponding to τ/Δt, so that the output command voltage Voc is restored to the OFF-period reference value VB1. Thus, the process 4 (Step S26) is ended and the procedure proceeds to Step S21 of the process 2, which then stands by for the subsequent ON phase.

In the embodiment described above, it is assumed that the operation pattern is periodic but is not so short in period as to fall under the category of pulse operation. In actual applications, however, an operation pattern in which the ON/OFF switching is so short in period as to fall under the category of pulse operation is often required. In such cases, the output command voltage Voc may be varied according to a transition as shown in the chart of FIG. 6.

Figure 6:
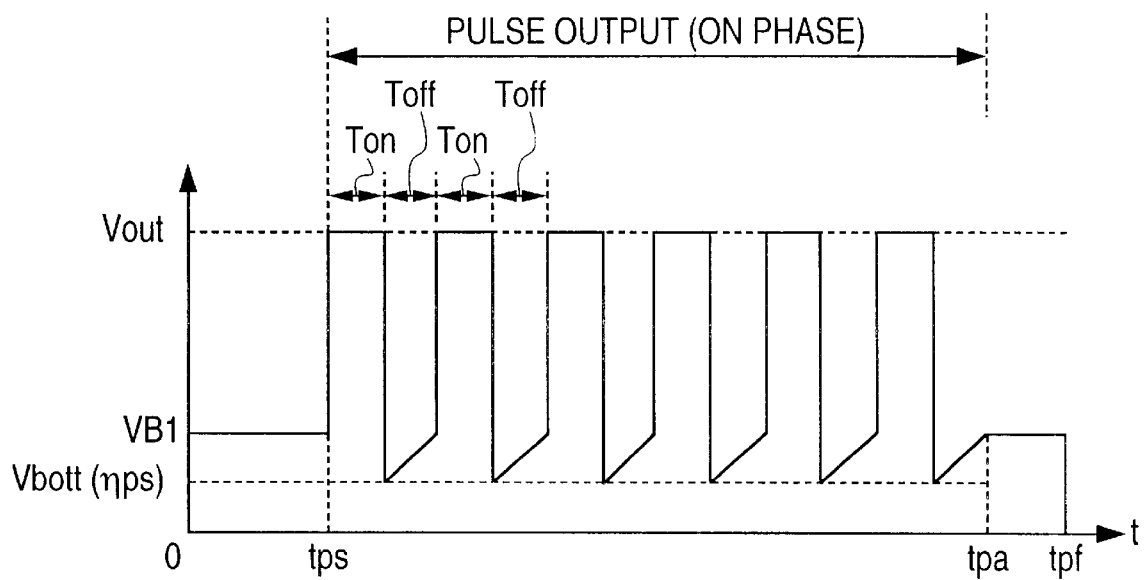
FIG. 6 is a chart illustrating transition of the output command voltage according to another embodiment (pulse operation) of the present invention.
Figure 7:
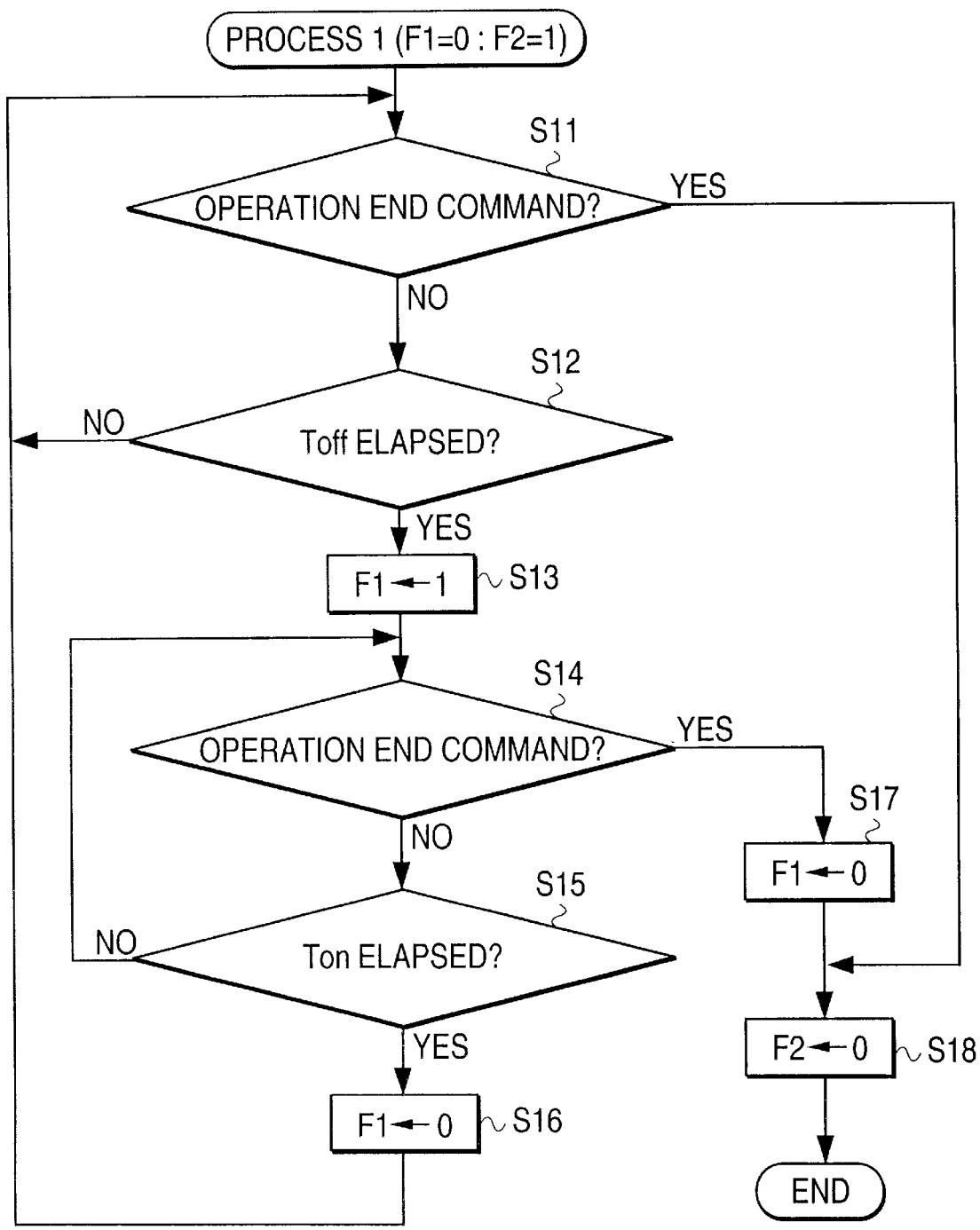
FIG. 7 is a flowchart showing an outline of process 1 for determining an operation pattern shown in FIG. 4.
Figure 8:
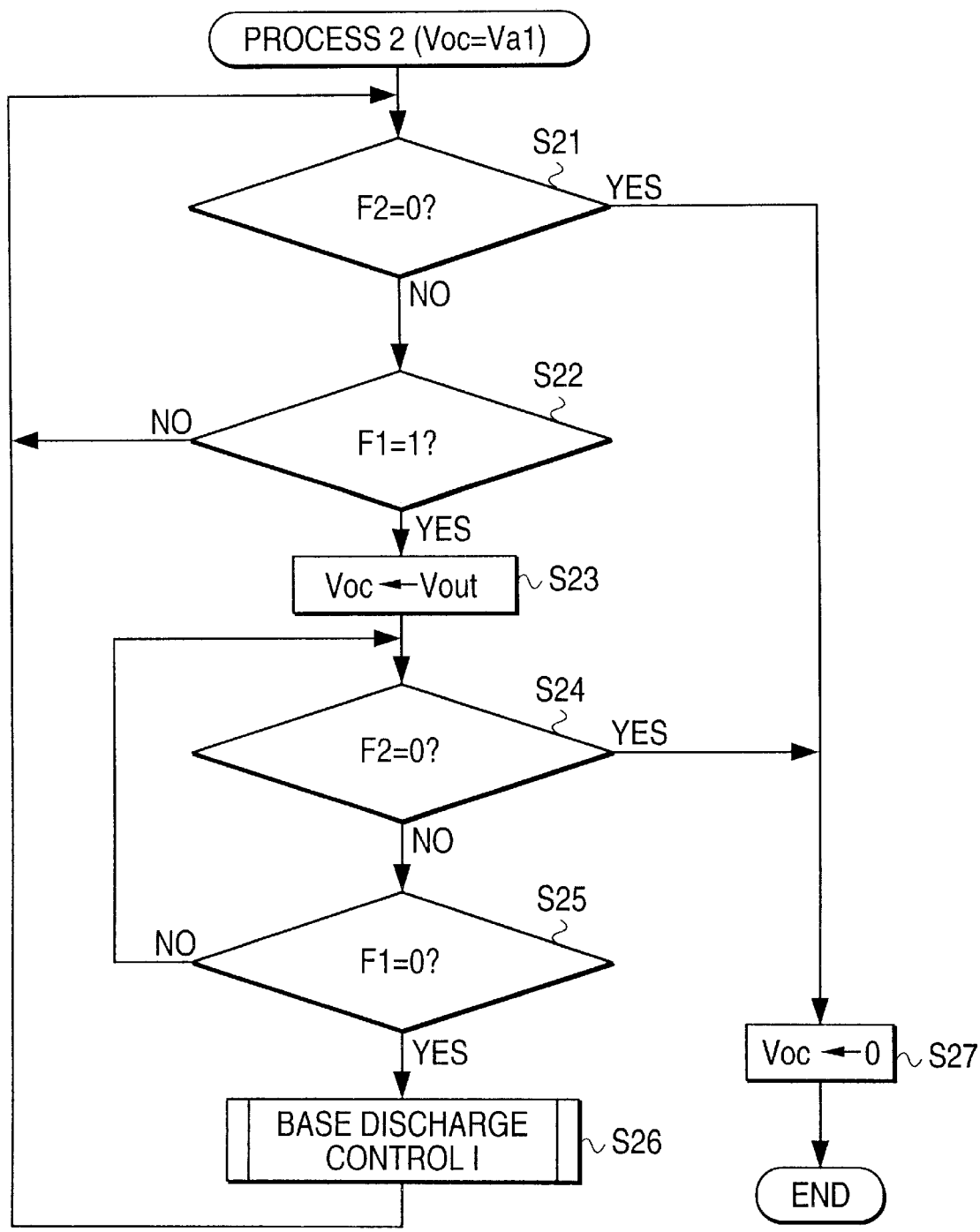
FIG. 8 is a flowchart showing an outline of process 2 for outputting the output command voltage Voc in the transition shown in an upper chart of FIG. 4.
Figure 9:
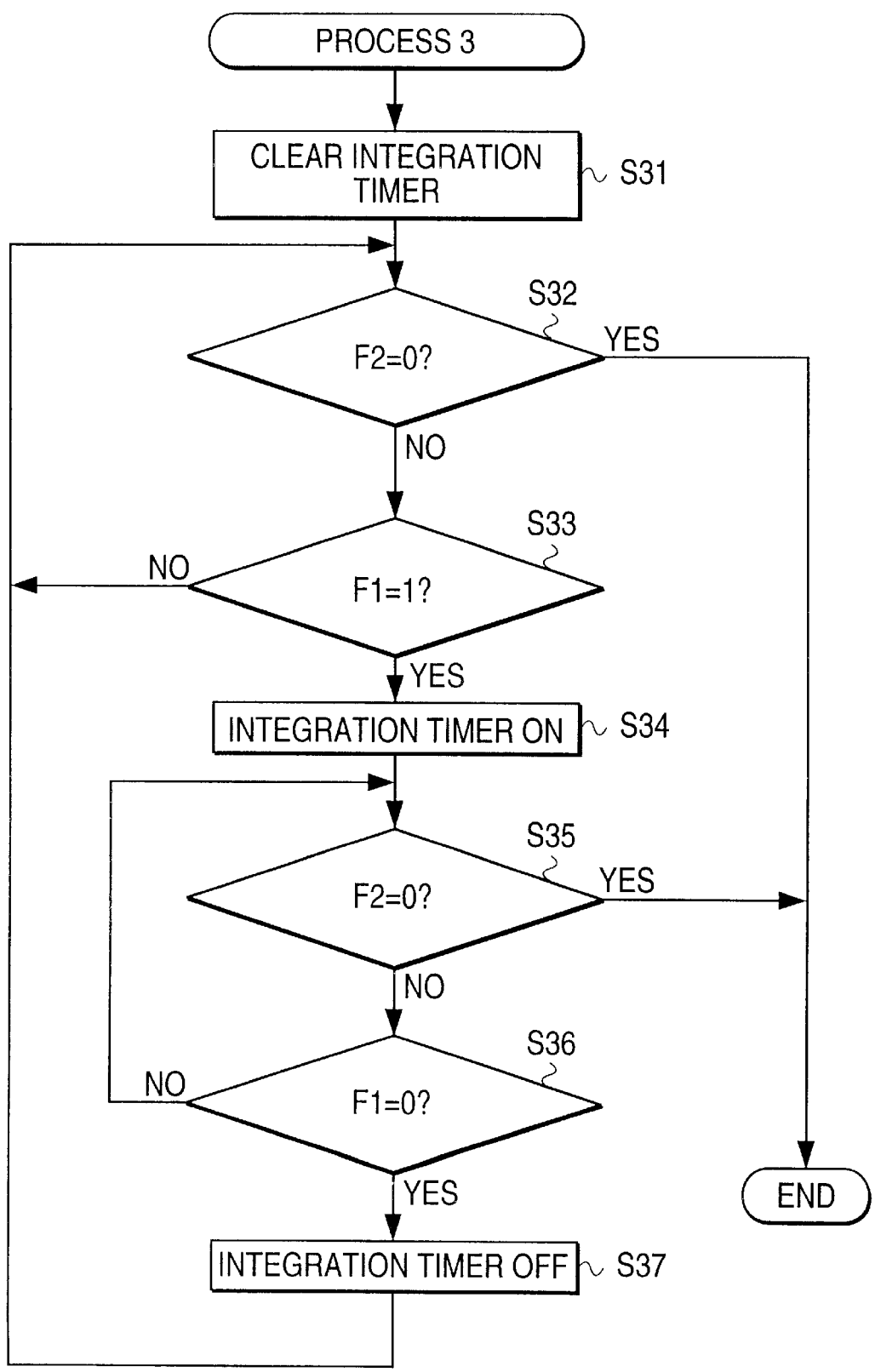
FIG. 9 is a flowchart showing an outline of process 3 for carrying out integration of beam ON period.

In the chart of FIG. 6, the horizontal axis indicates time t and the vertical axis indicates the output command voltage Voc. The illustrated pattern is characterized in that the ON period Ton and the OFF period Toff are both very short and that the OFF period Toff itself constitutes the rise time period corresponding to τ in the foregoing embodiment. Accordingly, in some cases, it may be difficult to calculate the OFF-period bottom value Vbott of the output command voltage Voc each time the OFF phase is arrived at as in the foregoing embodiment.

In this embodiment, therefore, control is performed in such a manner that the OFF-period bottom value Vbott(η) is calculated in advance of the start of each ON phase of the pulse operation by using the integrated value of beam ON period obtained until then, according to the same calculation process as employed in the foregoing embodiment, and that, during the OFF period of the pulse operation, the output command voltage Voc is increased up to the OFF-period reference value VB1 in the time period Toff. Since the temperature of the laser gas rises during the ON phases of pulse operation, the bottom value Vbott(η) should strictly undergo a gradual reduction during the pulse operation. However, it is very rare that pulse operation is continued for a long time without a halt period, and thus no practical problem arises.

Figure 11:
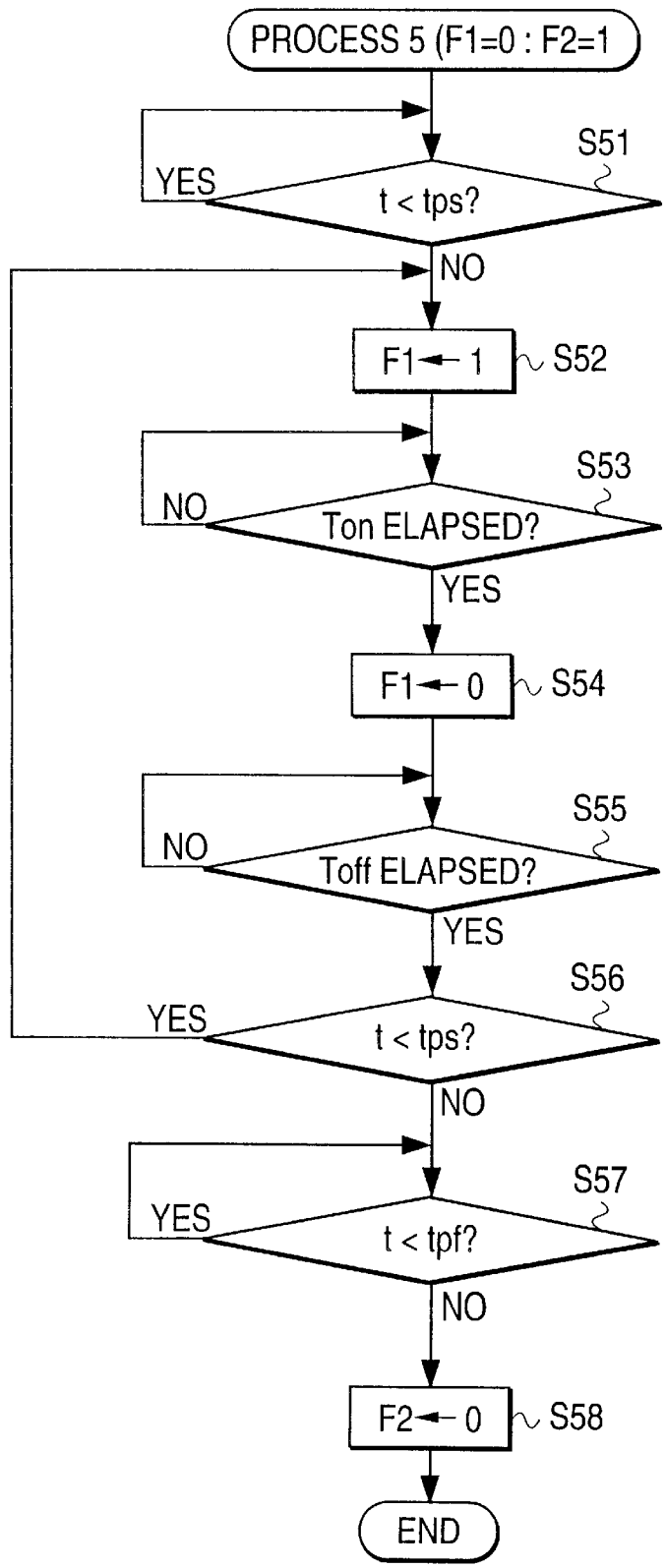
FIG. 11 is a flowchart showing an outline of process 5 for determining an operation pattern shown in FIG. 6.
Figure 12:
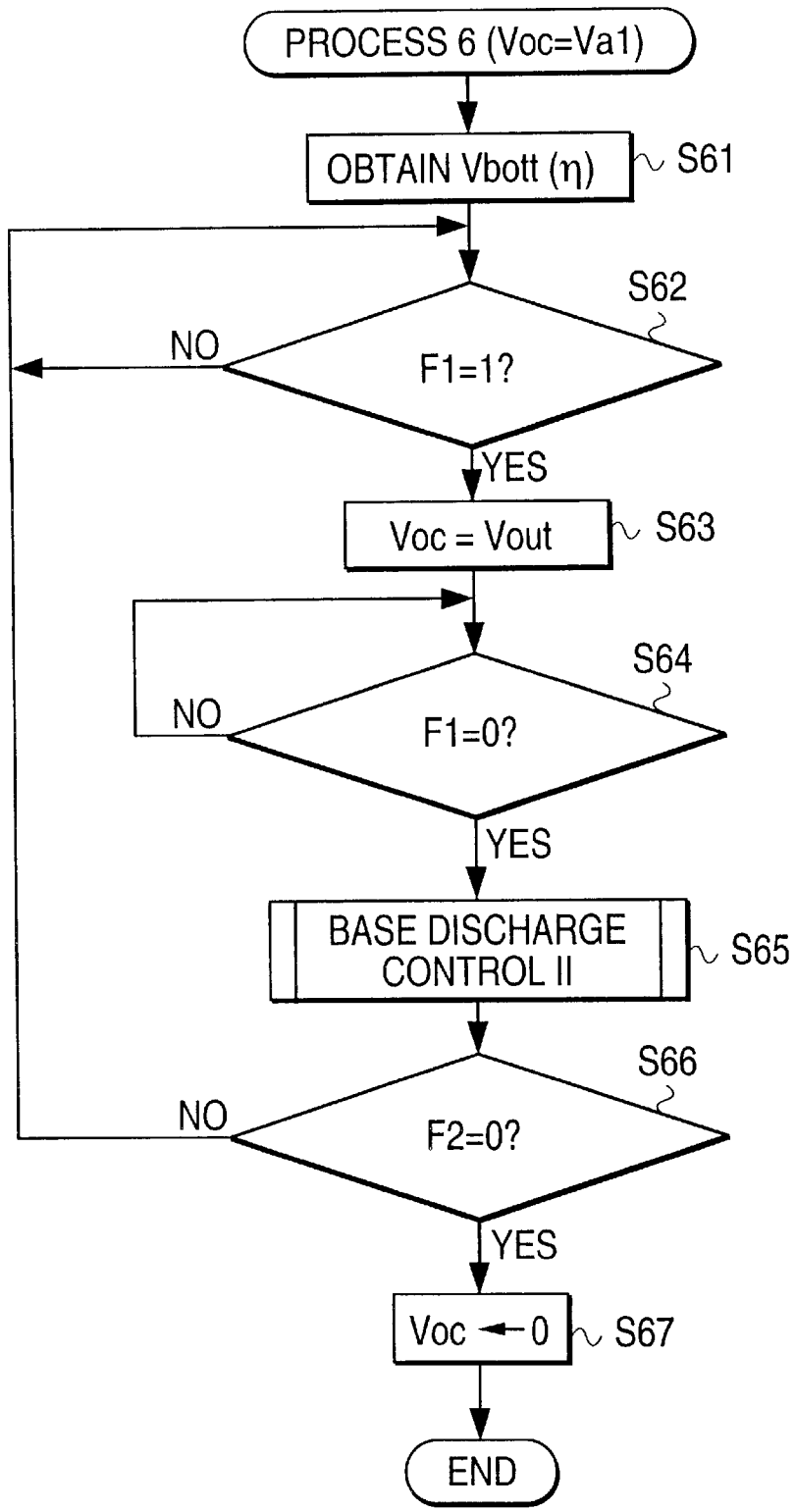
FIG. 12 is a flowchart showing an outline of process 6 for outputting the output command voltage Voc in the transition shown in the chart of FIG. 6.
Figure 13:
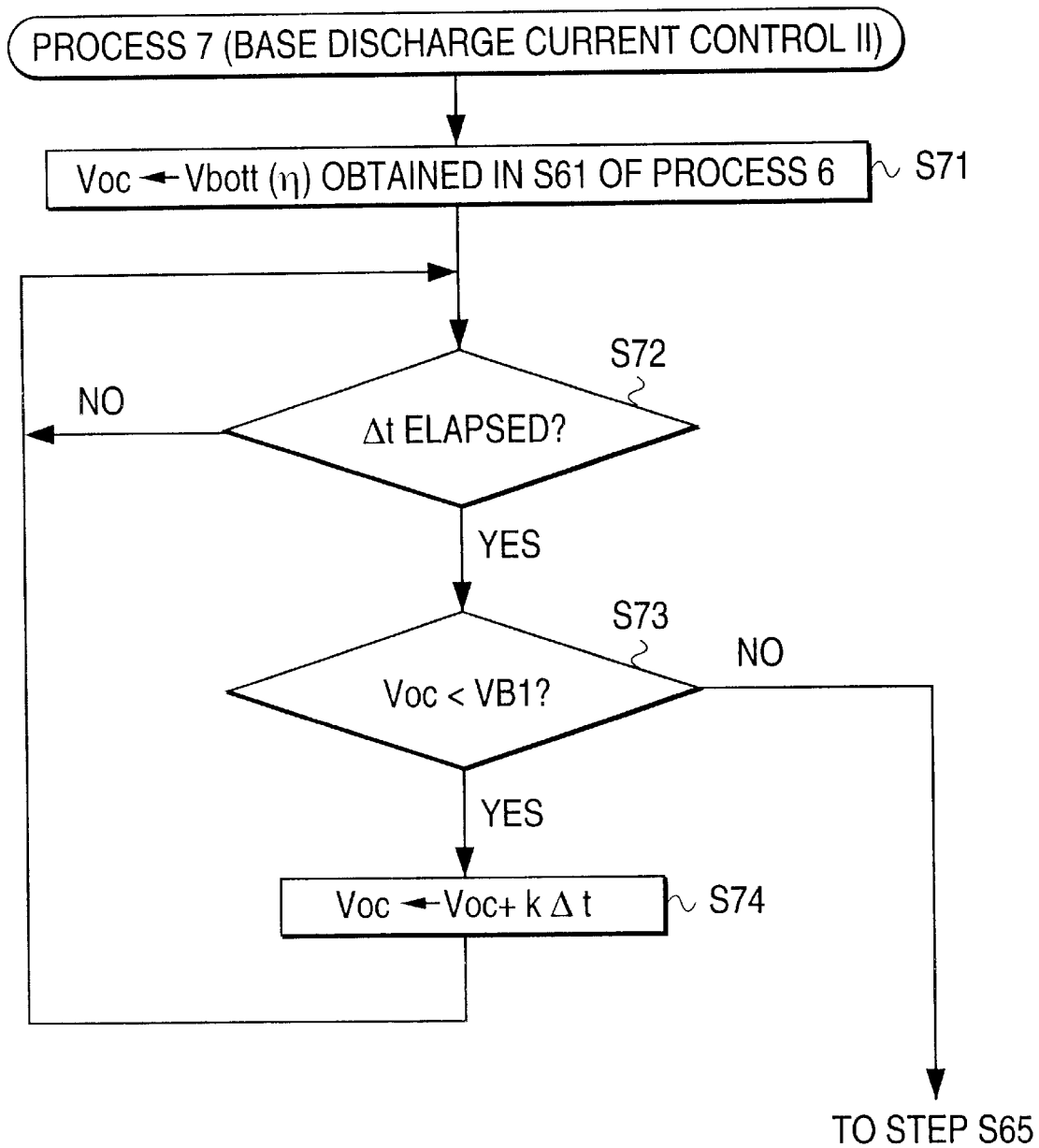
FIG. 13 is a flowchart showing an outline of process 7 for base discharge current control II.

A process for attaining the Voc transition shown in the chart of FIG. 6 is carried out as follows:

1) The process 3 (FIG. 9) for integrating the beam ON period is executed also in this embodiment. Since the contents of the process are already described, no explanation is given here.
2) In place of the process 1, a process 5 (FIG. 11) is performed.
3) In place of the process 2, a process 6 (FIG. 12) is carried out.
4) In place of the process 4, a process 7 (FIG. 13) is performed during execution of the process 6.

This embodiment also is based on the assumption that the process is executed immediately after completion of the startup process. For simplicity of explanation, it is also assumed that a pulse operation which starts at a point of time tps and ends at a point of time tpe is carried out only once and that the operation is completed at a point of time tpf. No operation end command is output except at the time tpf.

The following summarizes individual Steps S51 through S58 of the process 5 (FIG. 11) which determines the operation pattern as shown in FIG. 6. Since the assumption is made that the process is performed immediately after completion of the startup process, the initial values of the flags are as follows: F1=0 (beam OFF); F2=1 (power supply ON).

[S51] The procedure waits for the time tps to be reached, and then proceeds to Step S52.

[S52] To switch the beam ON, the flag F1 is inverted, that is, F1=1.

[S53] The procedure waits for the beam ON period Ton to elapse. When the period Ton has passed, the procedure proceeds to Step S54.

[S54] To switch the beam OFF, the flag F1 is inverted, that is, F1=0, and the procedure proceeds to Step S55.

[S55] The procedure waits for the beam OFF period Toff to elapse. When the period Toff has passed, the procedure proceeds to Step S56.

[S56] It is determined whether or not the time tpe has been reached. If the time tpe has not yet been reached, the procedure returns to Step S52, and if the time tpe has been reached, the procedure proceeds to Step S57.

[S57] The procedure waits for the time tpf to be reached, and then proceeds to Step S58.

[S58] The flag F2 is inverted, that is, F2=0, and the process is ended.

The following is a summary (Steps S61 through S67) of the process 6 (FIG. 12) which is executed concurrently with the process 5. The initial value of the output command voltage Voc is VB1 (OFF-period reference output command voltage value), that is, Voc=VB1, for the same reason as stated above with reference to the process 5.

[S61] Using the set values VB1, VB2, ηB2. Pmax, etc., the laser output Wout corresponding to Vout and the value of the integration timer (see process 3), the calculations indicated by the aforementioned equations (6) and (7) are performed to obtain the OFF-period bottom value Vbott(η). Preferably, however, the values VB2 and ηB2 are suitably tuned taking specific conditions for the pulse operation into consideration.

[S62] After the relationship F1=1 is fulfilled, the procedure proceeds to Step S62.

[63] The output command voltage Voc is switched from the OFF-period reference value VB1 to the command value Vout for the ON period.

[S64] After the flag F1 is inverted so that the relationship F1=0 may be fulfilled, the procedure proceeds to Step S65.

[S65] A process (base discharge current control II) for controlling the base discharge current is executed, and then the procedure proceeds to Step S66. In the process of the base discharge current control II, as described in detail later with reference to the process 7 (see FIG. 13), Voc is once reduced to the OFF-period bottom value Vbott and then is increased up to the OFF-period reference value VB1 in the time period Toff during the OFF phase of the pulse operation, as shown in the chart of FIG. 6.

[S66] On confirming that the relationship F2=0 is not fulfilled, the procedure returns to Step S62. If F2=0, then it means that the time tpf has been reached, and in this case, the procedure proceeds to Step S67 for bringing the operation to an end.

[S67] The output command voltage Voc is switched from the OFF-period reference value VB1 to zero, that is, Voc=0, whereby the gas discharge is completely stopped and the process is ended.

The following is a summary (Steps S71 to S74) of the base discharge current control II (FIG. 13) executed in Step S65 of the process 6.

[S71] The OFF-period bottom value Vbott($\eta$), which is obtained beforehand in Step S61, is set as the output command voltage Voc.

[S72] The procedure waits for a time period $\Delta t$ to elapse. The time period $\Delta t$ represents a very short period of time which is an integral multiple of the ITP (processing period) of the CPU, and is considerably shorter than the OFF period Toff.

[S73] While the output command voltage Voc is lower than (not yet restored to) the OFF-period reference value VB1, the procedure proceeds to Step S74. When Voc has been restored to VB1, the process 7 is ended and the procedure immediately returns to Step S66 of the process 6.

[S74] The output command voltage Voc is set to a value higher than the current Voc value by a very small amount k$\Delta t$, and the procedure returns to Step S72. Symbol k denotes a coefficient determining the gradient at which the output command voltage is restored from the OFF-period bottom value Vbott($\eta$) to the OFF-period reference value VB1, as in the case of the foregoing embodiment. In the case of pulse operation, however, it is practical to set the OFF period Toff itself as the rise time period, because only a very short time is left before the succeeding ON phase. Accordingly, k is preferably set to a value indicated by the following equation (11):

$$k=[VB1-Vbott(\eta)]/Toff \quad (11)$$

After the time period Toff elapses following the output of Vbott($\eta$), the processing cycle of Steps S71 through S74 is executed a number of times corresponding to Toff/$\Delta t$, so that the output command voltage Voc is restored to the OFF-period reference value VB1. Thus, the procedure proceeds from Step S73 to Step S61 of the process 6, and the subsequent ON phase starts immediately.

As described above, according to the present invention, response of the actual output of a gas discharge excitation laser device to the ON-to-OFF switching of a laser output command is improved, so that the ON/OFF timing of the command output can be made coincident with that of the actual output. This makes it possible to improve the machining accuracy of laser beam machining, for example.

What is claimed is:

1. A gas discharge excitation laser device comprising:
 a gas discharge tube for performing laser excitation of a laser medium to obtain a laser output;
 power supply means for supplying electric power to said gas discharge tube; and
 control means for controlling said power supply means, said control means outputting, to said power supply means, an ON command to turn the laser output to an ON state by subjecting the laser medium to laser excitation by means of discharge of said gas discharge tube and an OFF command to turn the laser output to an OFF state without stopping the discharge of said gas discharge tube, the OFF command causing said power supply means to supply said gas discharge tube with a bottom power smaller than an OFF-period reference power which is suitable for maintaining a base discharge current when gas in said gas discharge tube is cold, and then increasing the electric power supplied from said power supply means to said gas discharge tube.

2. The gas discharge excitation laser device according to claim 1, wherein said ON and OFF commands include an output command voltage signal, magnitude of the electric power supplied from said power supply means to said gas discharge tube being controlled in accordance with said output command voltage signal.

3. The gas discharge excitation laser device according to claim 2, wherein said control means determines an output command voltage signal for supplying the bottom power from said power supply means to said gas discharge tube, prior to start of each laser output in a pulse operation of said gas discharge excitation laser device.

4. The gas discharge excitation laser device according to claim 1, wherein electric power supplied from said power supply means to said gas discharge tube after the supply of the bottom power is increased up to said OFF-period reference power.

5. The gas discharge excitation laser device according to claim 4, wherein a time period $\tau$ for the electric power supplied from said power supply means to said gas discharge tube to reach said OFF-period reference power after the supply of said bottom power is set in advance.

6. A gas discharge excitation laser device comprising:
 a gas discharge tube for performing laser excitation of a laser medium to obtain a laser output;
 power supply means for supplying electric power to said gas discharge tube; and
 control means for controlling said power supply means, said control means outputting, to said power supply means, an ON command to turn the laser output to an ON state by subjecting the laser medium to laser excitation by means of discharge of said gas discharge tube and an OFF command to turn the laser output to an OFF state without stopping the discharge of said gas discharge tube, the OFF command causing said power supply means to supply said gas discharge tube with a bottom power smaller than an OFF-period reference power which is necessary for maintaining a base discharge current when gas in said gas discharge tube is cold, and then increasing the electric power supplied from said power supply means to said gas discharge tube,
 wherein said bottom power is determined in accordance with an index $\eta$ indicative of an increase of temperature of laser gas in said gas discharge tube.

7. The gas discharge excitation laser device according to claim 6, wherein said ON and OFF commands include an output command voltage signal, magnitude of the electric power supplied from said power supply means to said gas discharge tube being controlled in accordance with said output command voltage signal.

8. The gas discharge excitation laser device according to claim 6, wherein the electric power supplied from said power supply means to said gas discharge tube after the supply of said bottom power is increased up to said OFF-period reference power.

9. The gas discharge excitation laser device according to claim 8, wherein a time period τ for the electric power supplied from said power supply means to said gas discharge tube to reach said OFF-period reference power after the supply of said bottom power is set in advance.

10. The gas discharge excitation laser device according to claim 6, wherein said control means includes index value calculating means for calculating a value of said index η based on a product of magnitude of the laser output and a laser beam ON period, and means for determining said bottom power based on the index value obtained by said index value calculating means.

11. The gas discharge excitation laser device according to claim 10, wherein said index η is calculated according to an equation below, $$\eta = (Pc/Pmax) \times \text{Beam ON Period}$$

where

Pc: a laser output during a beam ON period; and

Pmax: a maximum rated laser output.

12. The gas discharge excitation laser device according to claim 11, wherein an OFF-period bottom value Vbott(η) which is an output command voltage for supplying said bottom power to said gas discharge tube is determined by the following polygonal-line function of said index η indicative of an increase of temperature of the laser gas in said gas discharge tube, $$Vbott(\eta) = VB1 - [(VB1 - VB2)/\eta B2]\eta \quad (0 \leq \eta \leq \eta B)$$

$$Vbott(\eta) = VB2 \quad (\eta > \eta B)$$

where

VB1: an output command voltage value for maintaining the base discharge current when the laser gas is cold;

VB2: a clamp value defining a lower limit on the OFF-period bottom value Vbott(η); and ηB2: a value of η when Vbott(η) is reduced to the lower-limit clamp value VB2.

13. The gas discharge excitation laser device according to claim 12, wherein at least one of the values VB1, VB2 and ηB2 is allowed to be variably set.

14. The gas discharge excitation laser device according to claim 12, wherein the electric power supplied from said power supply means to said gas discharge tube after the supply of said bottom power is increased until said output command voltage increases from said value Vbott(η) up to said OFF-period reference value VB1.

15. The gas discharge excitation laser device according to claim 12, wherein said control means determines an output command voltage signal for supplying the bottom power from said power supply means to said gas discharge tube, prior to start of each laser output in a pulse operation of said gas discharge excitation laser device.

* * * * *

UNITED STATES PATENT AND TRADEMARK OFFICE
CERTIFICATE OF CORRECTION

PATENT NO. : 6,097,747
DATED : August 1, 2000
INVENTOR(S) : Nobuaki IEHISA, et al.

It is certified that error appears in the above-indentified patent and that said Letters Patent is hereby corrected as shown below:

On the Title Page, Item

[75]  change "Osihino-mura" to --Minamitsuro--.

73]  change "Minamitsuru-gun" to --Yamanashi--.

[30]  change "1997" to --1996--.

Column 1,
    line 7, delete "a" (first occurrence) ;*
    line 44, after "value" (second occurrence) insert --(--.

Column 6,
    line 43, change "ON-OFF" to --ON → OFF-- and then insert --,--
        after "transistor".

Column 7,
    equation (1), change "$\leq$" to --$\geq$--.

UNITED STATES PATENT AND TRADEMARK OFFICE
CERTIFICATE OF CORRECTION

PATENT NO. : 6,097,747
DATED : August 1, 2000
INVENTOR(S) : Nobuaki IEHISA, et al.

It is certified that error appears in the above-indentified patent and that said Letters Patent is hereby corrected as shown below:

Column 8,
    line 66, delete ",".

Column 10,
    line 5, "[S16]" begins a new paragraphs.

Column 11,
    line 23, change "($\eta$)" to --($\eta$i)--.

Signed and Sealed this

Tenth Day of April, 2001

Attest:

NICHOLAS P. GODICI

Attesting Officer     Acting Director of the United States Patent and Trademark Office